United States Patent Office 3,032,515
Patented May 1, 1962

3,032,515
METHOD OF PREPARATION AND STABILIZATION OF CATALYSTS
Orville N. Hinsvark, Louisville, Ky., assignor to Catalysts and Chemicals Inc., Louisville, Ky., a corporation of Delaware
No Drawing. Filed Oct. 27, 1958, Ser. No. 769,540
8 Claims. (Cl. 252—466)

This invention relates to the method for stabilizing metallic catalysts and more specifically to a method of preserving the activity of an active metallic catalyst during a period of non-use.

Reduced metal and supported metal catalysts have been found to be extremely effective for the promotion of various hydrogenation reactions. These catalysts have usually been prepared by the reduction with hydrogen of particular metal compounds, mixtures thereof, or salts of the metals at elevated temperatures. It is well known that the easily reducible metals, viz. copper, nickel, cobalt and iron, when prepared in catalytically active form are sensitive to oxidation and become pyrophoric upon exposure to an oxygen-containing atmosphere, thereby losing their catalytic activity. The problem of handling, storing and transporting active metallic catalyst of this class while preventing loss of activity is therefore an important one.

Many methods for stabilizing and preserving such catalysts have been disclosed. In the fats and oils industry the most common method is that in which the freshly prepared catalyst is transferred directly without exposure to an oxidizing agent into an inert medium such as the fat or oil which is to be hydrogenated. Thus the catalysts have been prepared in flake form using the "chill roll" technique, or in cubes or drums of solid protective media. Other expedients have entailed the usage of gaseous inert atmospheres and sealed containers.

Another method involves stabilizing the catalyst and rendering it relatively insensitive to oxidation by exposing it in its freshly reduced state to an inert gas containing very small concentrations of air or oxygen. This treatment destroys the most active surface points by superficial oxidation and thus reduces its pyrophoric nature. Unless this process is performed within very narrow ranges of temperature, however, the activity of the catalyst is materially reduced. Probably the most preferred method of utilizing this expedient is through the fluidized technique which, however, requires specialized equipment and apparatus.

This invention has as its object to provide an improved method of retaining the activity of a metallic catalyst during periods of non-use. Another object is to provide a method of preparing, handling and transporting a freshly prepared metallic catalyst. Another important object of this invention is to develop a simple and economic method of catalyst preparation so that catalyst so prepared can be easily handled in air without danger to the operator and without injury to the catalyst. Other important objects will appear hereinafter.

These objects are accomplished by a method which comprises thermal decomposition of a metal salt of an organic acid in a closed system and thereafter allowing the resulting catalyst to cool to atmospheric temperature in a static atmosphere.

The metals to which this invention is applicable are those which in the catalytically active state are pyrophoric upon exposure to oxygen. The most notorious pyrophoric metals are commonly termed as the easily reducible metal oxides and comprise the following:

Copper, nickel, cobalt and iron. Organic salts of these metals may be derived from various organic acids. Generally, the short chain aliphatic acids, such as acetic, formic, citric, oxalic, tartaric, malic are preferred, although non-aliphatic acids may be utilized in admixture therewith and sometimes possess certain advantages. Generally, however, because of its cost and availability, oxalic acid is preferred. The temperature of decomposition may vary within a relatively wide range of from 200 to 400° C. Usually it is preferred to effect decomposition at the lowest temperature consonant with a good degree of thermal conversion.

The reason that catalysts produced by this method are rendered non-pyrophoric is not thoroughly understood; however, it is postulated that the metals resulting from thermal decomposition are stabilized by the gaseous products of decomposition of the acid radical. While I do not wish to be bound by any theories as to the mechanism of this phenomenon, it is believed that the decomposition products of the salts are chemisorbed upon the most active surface points of the reduced metal. This much is known, however, nickel powder, prepared by thermal decomposition of nickel oxalate, is, upon cooling in a static atmosphere, non-pyrophoric to the extent that it can be heated in air over a Bunsen burner for several minutes without oxidizing. The invention will be better understood by reference to the following examples which will further illustrate the nature and scope thereof.

*Example 1*

100 grams of nickel oxalate were placed in a glass container which was connected by a tube to a water trap. The container was placed in a muffle furnace in such a manner that the tube projected through a hole in the door of the muffle and connected with the water trap on the outside of the furnace. The muffle furnace was then heated to a temperature of 650° F., (343° C.) and maintained at that temperature for about 24 hours. The gaseous decomposition products of the nickel oxalate forced the residual air from the glass container through the water trap and into the outside atmosphere. The container was then removed from the muffle and after about an hour the tube was sealed at a point between the water trap and the container. Upon cooling to ambient temperature, the glass container was unstoppered and the contents exposed to air. The material appeared as a black finely divided non-pyrophoric powder. Analysis showed the nickel was 100% reduced.

*Example 2*

100 grams of nickel formate were placed in the glass container of Example 1 and placed in a muffle which was heated to a temperature of about 465° F. (240° C.) and maintained at that temperature for 24 hours. The container was removed from the muffle and after about an hour the tube connecting the container and the water trap was sealed. Upon cooling to ambient temperature, the glass container was unstoppered and the contents exposed to air. The material appeared as a black finely divided non-pyrophoric powder.

*Example 3*

100 grams of nickel oxalate were placed in a two-necked flask. A tube connected to a water trap as in Example 1 was inserted through the stopper of one neck. Another tube connected to a nitrogen cylinder was inserted through the stopper of the other neck. The flask was then placed in a muffle which was heated to 650° F. (343° C.) and maintained at that temperature for 24 hours as in Example 1. After removing the flask from the muffle, nitrogen flow was immediately begun to flush the gaseous decomposition products from the flask. After cooling to ambient temperature, the nitrogen flow was stopped and the flask was unstoppered. The material upon exposure to air was highly pyrophoric and immediately oxidized with evolution of considerable heat.

*Example 4*

100 grams of copper oxalate, 100 grams of iron oxalate and 100 grams of cobalt oxalate were placed in three separate containers and treated as in Example 1. Upon cooling to ambient temperature, each of the containers was unstoppered, and the contents thereof exposed to air. All of these metals were stable and none were pyrophoric.

It will be noted that in Example 3, flushing of the gaseous decomposition products of the organic acid radical, during the cooling step, affected the stability of the nickel so that it was pyrophoric. Accordingly it is felt that the mechanism hereinbefore presented accounts for the stabilization of these catalytic metals. Further, all of these examples tend to cast considerable doubt on the widely accepted theory that catalytic activity is due to adsorbed hydrogen on the catalyst surface, since no hydrogen is evolved as such in the decomposition of a metallic oxalate. My researches have shown that despite the absence of adsorbed hydrogen on the stabilized metal powders of this invention, these materials possess catalytic activity in many hydrogenation reactions without prior reduction.

*Example 5*

A batch of 3/16" catalyst pellets containing 35% nickel on a reduced basis was prepared by admixing 35 parts by weight of stabilized nickel produced by the method of Example 1 with 62 parts by weight of alumina hydrate and 3 parts by weight of graphite. This mixture was tableted utilizing a Stokes tableting machine and 50 cc. of these tablets were charged to a reactor maintained under isothermal conditions by means of a Dowtherm jacket. Isopropyl alcohol contaminated with 2% acetone was passed over the catalyst at a liquid space velocity of 1.5, a temperature of 200° F. and a pressure of 500 p.s.i.g. Liquid space velocity is defined as the volumes of liquid passed over a volume of catalyst per hour under standard conditions of temperature and pressure. Hydrogen was passed with the alcohol-acetone mixture at a gas space velocity of 5000. Gas space velocity is defined as volumes of gas passed over a volume of catalyst per hour under standard conditions of temperature and pressure. The concentration of ketones in the effluent gas was about 0.05%. Calculated equilibrium is 0.04%. The liquid space velocity was then increased to 2.7 and the concentration of ketone in the effluent was 0.06%.

*Example 6*

A batch of 3/16 inch catalyst containing 35% nickel on a reduced basis was prepared as follows. Equal parts of an aqueous solution of nickel nitrate and nickel carbonate were slurried with commercial silica alumina (containing about 85% silica and 12% alumina). This admixture was calcined at a temperature of 900° F. for twelve hours to convert the salts to the oxide. The cooled product was then mixed with 25 parts of a cementitious binder and water, and pelleted. The pellets were allowed to cure by sprinkling with water for several days. 50 cc. of these tablets were charged to the reactor described in Example 5 and reduced by passage of hydrogen thereover at a temperature of 750° F. for 12 hours. The catalyst was then tested for activity with the same feed and under the same conditions of Example 5 and the ketone in the effluent at a liquid space velocity of 1.5 was found to be about 0.1%.

*Example 7*

A commercial catalyst which contained about 35% nickel on a reduced basis was tested under the conditions of Example 6. The ketone in the effluent at a space velocity of 1.5 was found to be about 0.1%.

The advantages of operating with the catalyst of this invention is obvious. It will be noted that with the catalysts of Examples 6 and 7 a reduction with hydrogen at a temperature of 750° F. was required even though the reaction temperature was only 200° F. In other words, sufficient heating apparatus to raise the temperature over three times that required by the process is required to merely prepare the catalyst for use. In addition, the catalyst of this invention approaches equilibrium whereas the catalysts of Examples 6 and 7 are much less active.

While the examples presented herein have shown the preparation of stabilized catalytic metal powders, it will be understood that the metallic organic salts may be impregnated or precipitated upon suitable carriers prior to thermal decomposition and stabilization. Thus cobalt oxalate may be precipitated upon kieselguhr or nickel acetate may be impregnated on alumina and the resulting materials may then be calcined and cooled in a static atmosphere to produce stable non-pyrophoric catalytic masses. As previously indicated, metal salts of the short chain-aliphatic organic acids, such as acetic, formic, citric, oxalic, tartaric, etc., may be utilized. Other metallic constituents, such as the difficultly reducible metals, may be added thereto either as salts of organic or inorganic acids to produce the well known catalysts containing one or more of the easily reducible metals promoted with one or more of the difficultly reducible metal oxides. Other changes and modifications such as will present themselves to those familiar with the art may be made without departing from the spirit of this invention, the scope of which is commensurate with the following claims:

I claim:

1. A non-pyrophoric catalyst which comprises an easily reducible metal selected from the group consisting of nickel, cobalt, iron and copper, said catalyst being resistant to atmospheric oxidation during periods of non-use and maintaining high catalytic activity for hydrogenation without requiring prior reduction, prepared by thermal decomposition of the corresponding metal salt of an organic acid selected from the group consisting of acetic acid, formic acid, citric acid, oxalic acid, tartaric acid and malic acid, said organic acid salt being thermally decomposed at a temperature of from about 450° F. to about 750° F. in a closed system thereby surrounding the solid decomposition product of said thermal decomposition with gaseous products obtained solely by decomposing said organic acid salt, and holding said solid decomposition product to cool to atmospheric temperature in said atmosphere consisting essentially of said decomposition products of said metal salt whereby substantially complete conversion of said organic acid salt to corresponding non-pyrophoric metal is obtained.

2. The catalyst of claim 1 which consists predominantly of nickel.

3. The catalyst of claim 1 which consists predominantly of cobalt.

4. The catalyst of claim 1 which consists predominantly of copper.

5. The catalyst of claim 1 which consists predominantly of iron.

6. A method of preparing a non-pyrophoric metallic catalyst in which the metal is selected from the group consisting of nickel, cobalt, iron and copper, said catalyst being resistant to atmosphereic oxidation during periods of non-use and maintaining high catalytic activity for hydrogenation without requiring prior reduction which comprises the steps of decomposing the corresponding metal salt of an organic acid said organic acid being selected from the group consisting of acetic acid, formic acid, citric acid, oxalic acid, tartaric acid and malic acid, said thermal decomposition being carried out in a closed system at a temperature in the range of from about 450° F. to about 750° F. thereby surrounding the solid decomposition residue of thermal decomposition with gaseous products obtained solely by decomposing said organic acid salt and holding said residue to cool to atmospheric temperature in said atmosphere consisting essentially of the decomposition products of said metallic salt whereby substantially complete conversion of said salt to corresponding non-pyrophoric metal is obtained.

7. The method of preparing a catalyst according to claim 6 in which the non-pyrophoric metallic catalyst is admixed with an inert carrier selected from the group consisting of kieselguhr and alumina hydrate and the admixture is formed into suitable shapes.

8. A method as claimed in claim 6 wherein said organic acid is oxalic acid.

References Cited in the file of this patent

UNITED STATES PATENTS

| | | |
|---|---|---|
| 2,404,438 | Evans | July 23, 1946 |
| 2,404,444 | Kraus | July 23, 1946 |
| 2,525,144 | Mavity | Oct. 10, 1950 |
| 2,677,668 | Ahlberg | May 4, 1954 |
| 2,677,669 | Ahlberg | May 4, 1954 |
| 2,688,603 | Baldwin | Sept. 7, 1954 |
| 2,861,045 | Langer | Nov. 18, 1958 |